United States Patent
Fux et al.

(10) Patent No.: US 8,369,843 B2
(45) Date of Patent: Feb. 5, 2013

(54) METHOD OF RESPONDING TO AN INCOMING COMMUNICATION RECEIVED BY A HANDHELD DEVICE

(75) Inventors: Vadim Fux, Waterloo (CA); Denis Fedotenko, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1696 days.

(21) Appl. No.: 11/460,388

(22) Filed: Jul. 27, 2006

(65) Prior Publication Data
US 2008/0037744 A1 Feb. 14, 2008

(51) Int. Cl.
*H04M 3/42* (2006.01)
(52) U.S. Cl. ........... 455/415; 455/566; 455/556.2; 455/550.1; 455/412.1; 455/412.2; 455/466; 455/445; 455/417; 455/567; 379/88.01; 379/88.14; 379/373.02; 379/88.11; 379/88.26; 379/68; 379/76; 379/52; 370/230; 370/310; 340/7.1
(58) Field of Classification Search .......... 455/412, 455/563, 466, 445, 412.1, 412.2, 415; 379/52, 379/67.1, 88.01, 88.08, 88.11, 88.13, 88.14, 379/412; 704/264; 370/230
See application file for complete search history.

(56) References Cited

U.S. PATENT DOCUMENTS

| | | | | |
|---|---|---|---|---|
| 5,559,860 A | * | 9/1996 | Mizikovsky | 455/413 |
| 6,044,134 A | * | 3/2000 | De La Huerga | 379/88.08 |
| 6,816,577 B2 | * | 11/2004 | Logan | 379/67.1 |
| 7,010,288 B2 | * | 3/2006 | Brown et al. | 455/412.1 |
| 7,116,976 B2 | * | 10/2006 | Thomas et al. | 455/417 |
| 7,305,068 B2 | * | 12/2007 | Tucker et al. | 379/88.11 |
| 2002/0067808 A1 | * | 6/2002 | Agraharam et al. | 379/88.14 |
| 2002/0181671 A1 | * | 12/2002 | Logan | 379/88.13 |
| 2003/0228002 A1 | * | 12/2003 | Tucker et al. | 379/88.01 |
| 2005/0058067 A1 | * | 3/2005 | Chmaytelli et al. | 370/230 |
| 2005/0107093 A1 | * | 5/2005 | Dowling | 455/456.4 |
| 2005/0124324 A1 | * | 6/2005 | Thomas et al. | 455/412.1 |
| 2006/0052109 A1 | | 3/2006 | Ashman, Jr. et al. | |

FOREIGN PATENT DOCUMENTS

| | | |
|---|---|---|
| DE | 19648991 A1 | 6/1998 |
| DE | 10052368 A1 | 5/2002 |
| EP | 0763958 A2 | 3/1997 |
| EP | 0851647 A2 | 7/1998 |
| FR | 2813157 A1 | 2/2002 |
| GB | 2347593 A | 9/2000 |
| WO | 99/31909 A | 6/1999 |
| WO | 01/17275 A2 | 3/2001 |

* cited by examiner

*Primary Examiner* — April G Gonzales
(74) *Attorney, Agent, or Firm* — Perry + Currier Inc.; David J. Johnson

(57) ABSTRACT

A method for replying to an incoming communication received by a handheld electronic device comprises detecting an incoming communication, detecting a selection of one of a number of predetermined responses to the incoming communication and, responsive to detecting a selection, providing the one of said number of predetermined responses. An improved handheld electronic device implementing the method is also provided.

12 Claims, 2 Drawing Sheets

METHOD OF RESPONDING TO AN INCOMING COMMUNICATION RECEIVED BY A HANDHELD DEVICE

BACKGROUND

1. Field

The disclosure relates generally to handheld electronic devices and, more particularly, to a method for responding to an incoming communication received by a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Although some handheld electronic devices are stand-alone devices, many feature wireless communication capability for communication with other devices.

Such handheld electronic devices are generally intended to be portable. Many handheld electronic devices are small enough to fit within, for example, a jacket pocket, a belt holster, a briefcase, or a purse. These handheld electronic devices may incorporate a number of output devices (such as, for instance, a speaker, a display, an LED, and a vibrating mechanism) to notify a user of an incoming communication (e.g., telephone call, email, instant message, etc.).

Oftentimes, however, the user receives, and is notified of, an incoming communication at an inopportune time. For example, the user may receive a telephone call while attending a meeting. Although desiring to do so, the user may be unable to immediately answer and respond to the incoming call. Accordingly, the person placing the call may be redirected to the user's voice mail system which provides a general voice mail message as a response. In some instances, it may be important that the caller have immediate confirmation that the user received the call. However, a caller whom decides to leave a message within the user's voice mailbox remains uncertain as to when, if at all, the user received the message.

It would be desirable to provide an improved handheld electronic device which is structured to operate in an improved fashion in response to an incoming message received by the handheld electronic device.

BRIEF DESCRIPTION OF THE DRAWINGS

A full understanding can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
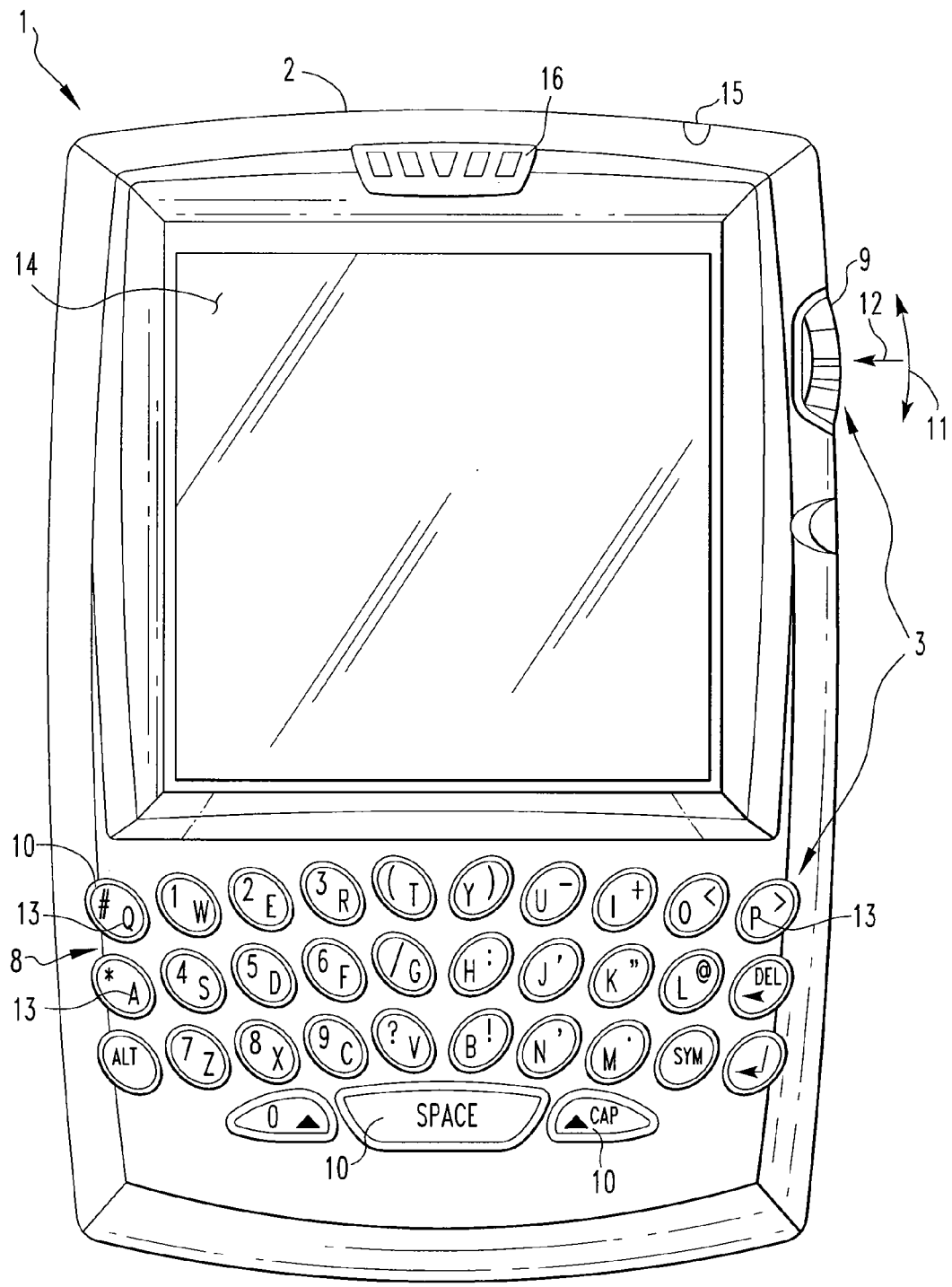
FIG. 1 is a top plan view of an improved handheld electronic device.
Figure 2:
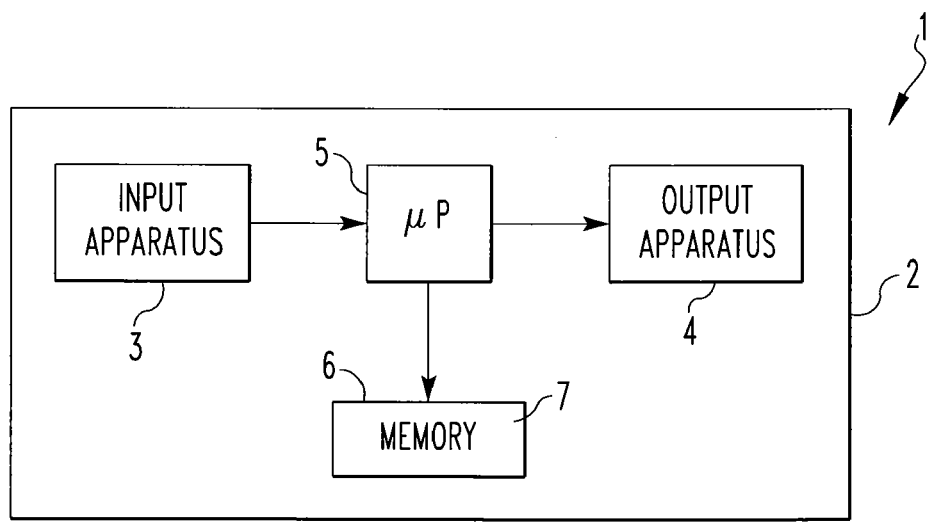
FIG. 2 is a schematic depiction of the handheld electronic device of FIG. 1.

An improved handheld electronic device 1 is indicated generally in FIG. 1 and is depicted schematically in FIG. 2. The exemplary handheld electronic device 1 includes a housing 2 upon which is disposed a processor unit that includes an input apparatus 3, an output apparatus 4, a processor 5, and a memory 6 for storing at least a first routine 7. The processor 5 may be, for instance, and without limitation, a microprocessor (µP) and is responsive to input signals from the input apparatus 3 and provides output signals to the output apparatus 4. The processor 5 also interfaces with the memory 6 and is capable of executing the at least first routine 7. Examples of handheld electronic devices are included in U.S. Pat. No. 6,452,588, U.S. Pat. No. 6,873,317, and U.S. Pat. No. 6,489,950, which are incorporated by reference herein.

As can be understood from FIG. 1, the output apparatus 4 includes a display 14, an LED 15, and a speaker 16, each of which may be responsive to one or more output signals from the processor 5. The input apparatus 3 includes a keypad 8 and a thumbwheel 9. The keypad 8 is in the exemplary form of a full QWERTY keyboard including a plurality of keys 10 that serve as input members. The keys 10 are disposed on a front face of the housing 2, and the thumbwheel 9 is disposed at a side of the housing 2. The thumbwheel 9 can serve as another input member and is both rotatable, as is indicated by the arrow 11, to provide input to the processor 5, and also can travel in a direction generally toward the housing 2, as is indicated by the arrow 12, to provide other input to the processor 5.

Many of the keys 10 include a number of linguistic elements 13 disposed thereon. As employed herein, the expression "a number of" and variations thereof shall refer broadly to any non-zero quantity, including a quantity of one. As can be seen in FIG. 1, one of the keys 10 of the keypad 8, for instances, includes as the linguistic elements 13 thereof the letter "Q" and the symbol "#". Generally speaking, when a key 10 is actuated, the handheld electronic device 1 is structured such that the processor 5 recognizes, as an input thereof, one of the number of linguistic elements 13 disposed on the actuated key 10. For example, when a user is composing a message and actuates the key having the letter "Q" and the symbol "#" disposed thereon, the processor 5 is structured to recognize that the user is attempting to insert either "Q" or "#" into the message.

The memory 6 can be any one or more of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 6 includes a number of routines depicted generally with the numeral 7 for the processing of data. The routines 7 can be in any of a variety of forms such as, without limitation, software, firmware, and the like. As will be explained in greater detail below, the routines 7 include a user-selectable response function as an application, as well as other routines.

Figure 3:
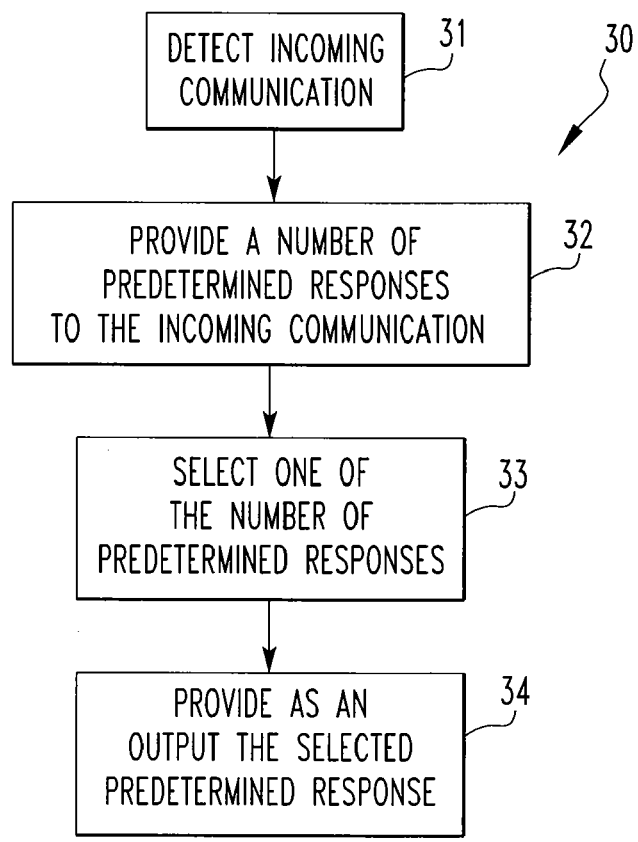
FIG. 3 is an exemplary flowchart depicting certain aspects of a user-selectable response function that can be executed on the handheld electronic device of FIG. 1.

An operational process 30 for implementing the user-selectable response function on the handheld electronic device 1 is illustrated in FIG. 3. Operational process 30 is initiated when the handheld electronic device 1 detects an incoming communication at operation 31. An incoming communication may include, for example and without limitation, a text-based message (e.g., email message; short message service (SMS) message, instant message (IM)) or a voice-based message (e.g., a telephone call) which is being received by the handheld electronic device 1. In the exemplary embodiment, the handheld electronic device 1 detects the sender and the format (e.g., text-based; voice-based) of the incoming communication.

After an incoming communication is detected in operation 31, a number of predetermined responses to the incoming communication are provided for selection by the user at operation 32. For instance, representations of the predetermined responses may be output to display 14. In the exemplary embodiment, the predetermined responses may include general responses and/or responses that are specific to the sender of the incoming communication. If the handheld electronic device 1 detects that the user's spouse is calling, for example, the responses provided for selection by the user may include the general responses "Can't talk right now" and "Call you back in five minutes" as well as the specific responses "On my way to pick up the kids" and "I'll be home soon". In contrast, if the handheld electronic device 1 detects that the user's employer is calling, for example, the responses provided for selection by the user may include the general responses "Can't talk right now" and "Call you back in five minutes" as well as the specific responses "I'm in a meeting now", "I'm talking with a client now", and "I'll be back in the office soon".

Additionally, in the current embodiment, the user may associate multiple groups of predetermined responses with the same sender, with each group being associated with a particular format of the incoming communication. For example, as discussed above, the predetermined responses associated with a speech-based communication (i.e., a telephone call) from the user's spouse may include the general responses "Can't talk right now" and "Call you back in five minutes" as well as the specific responses "On my way to pick up the kids" and "I'll be home soon". However, the predetermined responses associated with a text-based communication (i.e., an email) from the user's spouse may include the general responses "Message received" and "I'll email you back in five minutes" as well as the specific responses "Yes dear" and "No dear".

Once the predetermined responses are provided in operation 32, operational control passes to operation 33 where one of the predetermined responses is selected. In the exemplary embodiment, the predetermined responses provided in operation 32 (or representations thereof) are output to display 14 in a numbered list. The user may employ, for example and without limitation, the keys 10 or thumbwheel 9 to select the appropriate response. If, for example, the four predetermined responses which are discussed above as being associated with the user's spouse are output to display 14, the user may press the key 10 having the numeral "1" thereon to select response number "1" from the list (i.e., "Can't talk right now"), the key 10 having the numeral "2" thereon to select response number "2" from the list (i.e., "Call you back in five minutes"), the key 10 having the numeral "3" thereon to select response number "3" from the list (i.e., "On my way to pick up the kids"), or the key 10 having the numeral "4" thereon to select response number "4" from the list (i.e., "I'll be home soon"). Alternatively, the user may use the thumbwheel 9 to scroll (e.g., by rotating the thumbwheel 9 in a direction indicated by arrow 11) through the responses until the desired response is designated and then actuate the thumbwheel 9 (e.g., by causing the thumbwheel 9 to travel in the direction indicated by arrow 12) to select that designated response.

It should be noted that selection of one of the predetermined responses may be completed via other inputs. For example, and without limitation, display 14 may include touch screen functions such that actuation of display 14 (e.g., tapping a specific spot thereon) causes selection of one of the predetermined responses. Additionally, the handheld electronic device 1 may include a number of GPS enabled position sensors or other sensors which detect movement of the handheld electronic device 1. Accordingly, selection of one of the predetermined responses may be accomplished by moving the handheld electronic device up/down, forward/backward, and/or left/right (i.e., from one orientation and/or position to another orientation and/or position).

Once the predetermined response is selected in operation 33, operational control passes to operation 34 where the selected predetermined response is output to the sender. Although the predetermined responses are generally provided for selection by the user in text format on the display 14, the predetermined response selected by the user is output to the sender in a format (i.e., text-based, voiced-based, etc.) that is substantially the same as the incoming communication in the current embodiment. For example, if the incoming communication detected in operation 31 is an email message, the predetermined response selected by the user in operation 33 is output as an email message in operation 34. In contrast, if the incoming communication detected in operation 31 is speech-based (e.g., a telephone call), the predetermined response selected by the user in operation 33 is output in an audible, speech-based format (e.g., is a voice response) in operation 34.

In the current embodiment, the predetermined speech-based responses may be, for example and without limitation, a voice recording of the user or a text-based response that was converted to an audible, speech-based response. Likewise, the predetermined text-based responses may be, for example and without limitation, entered using the keypad 8 or converted from a recorded voice message.

The user-selectable response function of the present invention is structured to work in conjunction with the other functions of the handheld electronic device 1. For example, when the incoming communication detected in operation 31 is speech-based (e.g., a telephone call), in addition to providing a number of predetermined responses in operation 32, the user-selectable response function may also provide the user with the option of directing the incoming call into his/her voicemail system. Likewise, when the incoming communication detected in operation 31 is text-based (e.g., an email message), in addition to providing a number of predetermined responses in operation 32, the user-selectable response function may also provide the user with the option of directing the incoming call into his/her inbox without responding and/or the option of sending a message associated with, for example, the email program's out of office feature.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method for replying to an incoming communication received by a handheld electronic device, the method comprising:
    detecting an incoming communication, said detecting an incoming communication comprising:
        determining a sender of said incoming communication; and
        providing to a user a plurality of predetermined responses for selection, at least some of said plurality of predetermined responses being provided as a result of said determination of said sender, said at least some of said plurality of predetermined responses specific to said sender of said incoming communication;

detecting a selection of one of said plurality of predetermined responses to said incoming communication by detecting a movement of the handheld electronic device;
responsive to said detecting a selection, providing said one of said number of predetermined responses as a response to said incoming communication; and
determining a format of said incoming communication, and providing as at least a portion of said plurality of predetermined responses a number of predetermined responses in said format.

2. The method of claim 1, further comprising detecting as said incoming communication an audible incoming communication, and outputting on a display of the handheld electronic device as said at least some of said plurality of predetermined responses a representation of each of a plurality of predetermined audible responses for selection.

3. The method of claim 1 wherein said detecting a selection of one of a plurality of predetermined responses further comprises detecting an actuation of an input device of said handheld electronic device.

4. The method of claim 3 wherein said detecting an actuation of an input device includes detecting at least one of an actuation of a key on said handheld electronic device, an actuation of a thumbwheel on said handheld electronic device, an actuation of a touch screen on said handheld electronic device, and an actuation of a position sensor of said handheld electronic device.

5. The method of claim 1 wherein said detecting a movement of the handheld electronic device includes detecting at least one of a movement of the handheld electronic device from one orientation to another orientation, and a movement of the handheld electronic device from one position to another position.

6. The method of claim 1 wherein said detecting a movement of the handheld electronic device includes detecting the movement with a GPS sensor.

7. A handheld electronic device comprising:
a processor unit comprising a processor, an input apparatus, an output apparatus, and a memory having a routine stored therein, the processor unit being structured to:
    detect an incoming communication by:
        determining a sender of said incoming communication; and
        providing to a user a plurality of predetermined responses for selection, at least some of said plurality of predetermined responses being provided as a result of said determination of said sender, said at least some of said plurality of predetermined responses specific to said sender of said incoming communication;
    detect a selection of one of said plurality of predetermined responses to said incoming communication by detecting a movement of the handheld electronic device;
    responsive to detecting a selection, provide said one of said plurality of predetermined responses as a response to said incoming communication; and
    determine a format of said incoming communication, and provide as at least a portion of said plurality of predetermined responses a number of predetermined responses in said format.

8. The handheld electronic device of claim 7 wherein said processor unit is structured to detect as said incoming communication an audible incoming communication, and output on a display of the handheld electronic device as said at least some of said number of predetermined responses a representation of each of a plurality of predetermined audible responses for selection.

9. The handheld electronic device of claim 7 wherein said processor unit is further structured to detect as said selection an actuation of an input device of said handheld electronic device.

10. The handheld electronic device of claim 9 wherein said processor unit is structured to detect as said selection one of an actuation of a key on said handheld electronic device, an actuation of a thumbwheel on said handheld electronic device, an actuation of a touch screen on said handheld electronic device, and an actuation a position sensor of said handheld electronic device.

11. The handheld electronic device of claim 7 wherein said processor unit is further structured to detect as said detecting a movement of the handheld electronic device at least one of a movement of the handheld electronic device from one orientation to another orientation, and a movement of the handheld electronic device from one position to another position.

12. The handheld electronic device of claim 7 further comprising a GPS sensor, and wherein the processor unit is further structured to detect the movement with the GPS sensor.

* * * * *